United States Patent
Kirchem et al.

[15] 3,702,894
[45] Nov. 14, 1972

[54] PROCESS AND INSTRUMENT FOR MEASURING THE LENGTH OF A HOLLOW ELECTRODE IN AN ELECTROTHERMAL MELTING FURNACE

[72] Inventors: Heinz Kirchem, Bruhl-Vochem; Wilhelm Portz, Erfstadt Kierdorf, both of Germany

[73] Assignee: Knapsack Aktiengesellschaft, Knapsack bei Koln, Germany

[22] Filed: Dec. 20, 1971

[21] Appl. No.: 209,908

[30] Foreign Application Priority Data
Dec. 23, 1970 Germany..........P 20 63 449.5

[52] U.S. Cl. .................................13/1, 13/9, 13/18, 33/126.6, 73/321
[51] Int. Cl. .............................................H05b 7/08
[58] Field of Search.......13/1, 9, 18; 73/321; 33/126, 33/126.5, 126.6

[56] References Cited

UNITED STATES PATENTS

| | | |
|---|---|---|
| 2,854,752 | 10/1958 | Heacock...................33/126.6 |
| 3,471,626 | 10/1969 | DeWeese et al.................13/1 |
| 3,521,367 | 7/1970 | Grynovich et al. ......73/321 X |

*Primary Examiner*—Roy N. Envall, Jr.
*Attorney*—Arthur G. Connolly et al.

[57] ABSTRACT

The length of a hollow electrode in an electrothermal melting furnace is determine. To this end, dusty burden is introduced into the furnace by conveying the burden with the use of an auxiliary gas through a passageway left in the hollow electrode and, while supplying the dusty burden, the formation of a cushion of dusty burden around the lower end of said passageway in the hollow electrode is effected. A steel cable having a measuring rod secured to it is unrolled and advanced at short intervals through the said passageway in the hollow electrode so as to produce contact between the said measuring rod and the said cushion of dusty burden. The length of the hollow electrode is measured by determining the length of the unrolled steel cable and the steel cable is retracted.

11 Claims, 1 Drawing Figure

PATENTED NOV 14 1972
3,702,894
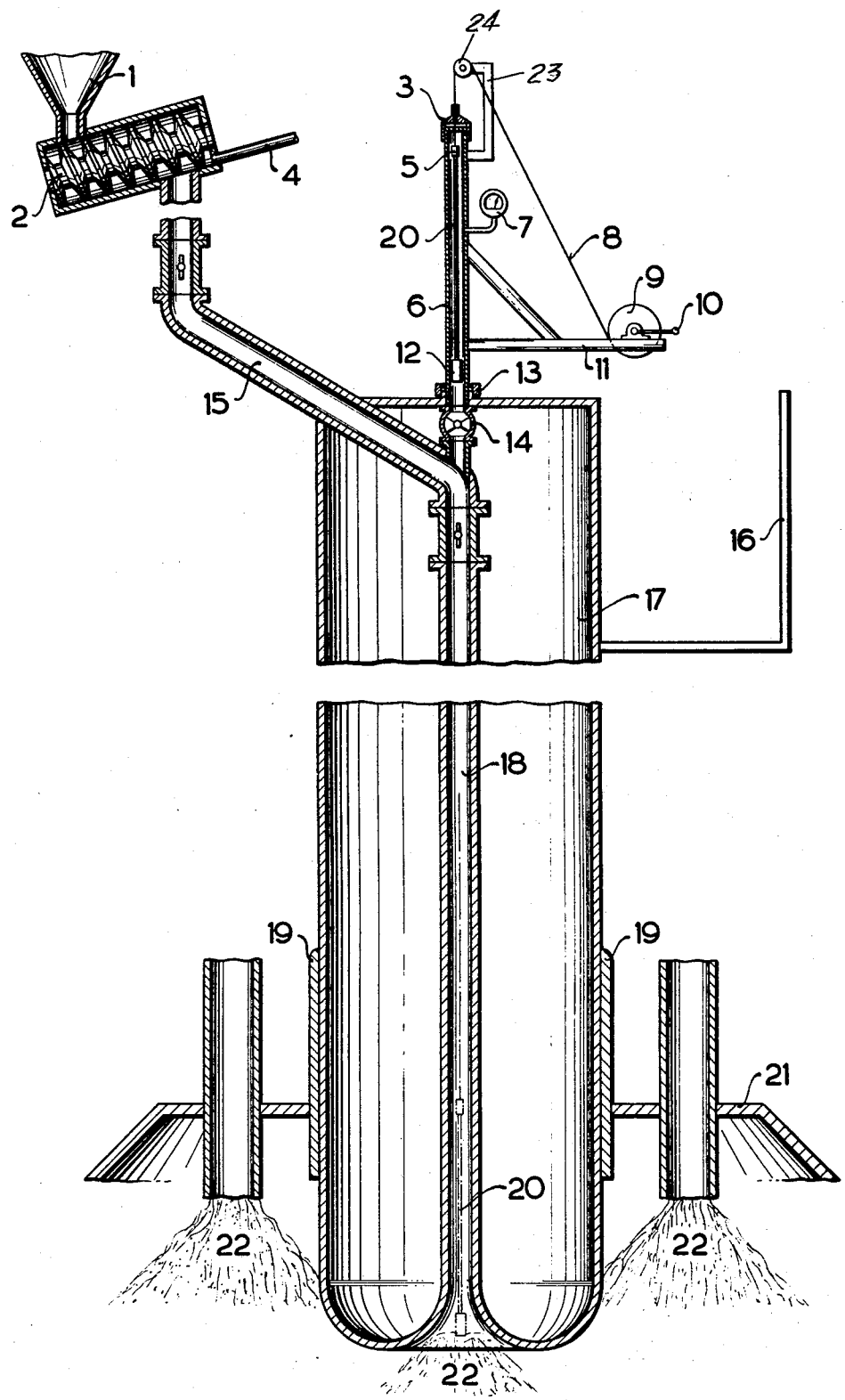

PROCESS AND INSTRUMENT FOR MEASURING THE LENGTH OF A HOLLOW ELECTRODE IN AN ELECTROTHERMAL MELTING FURNACE

The present invention relates to a process and an instrument for measuring the length of a hollow electrode in an electrothermal melting furnace.

It is generally accepted that certain operational conditions are required to be used and maintained so as to ensure regular and reliable operation in electrothermal melting furnaces. A critical factor with regard to this is the length which the electrodes have downstream of the current-carrying contact plates.

The determination of the electrodes' length is of particular importance if use is made of a polyphase furnace. This in view of the fact that operation therein is critically influenced not only by the absolute length of an electrode but also by the relation existing between the lengths of individual electrodes.

In those cases in which practical use is made of the measuring or testing methods described heretofore, it is necessary to arrest furnace operation. Various testing methods said to be applicable during operation, e.g., echo sounding or radioactive testing methods, have in fact been described earlier, but they have failed to produce satisfactory results.

It is an object of the present invention to provide a measuring method and instrument for practical use permitting the length of an electrode to be determined without the need to arrest operation in an electrothermal furnace fitted with a hollow electrode.

An exemplary form of the measuring instrument of the present invention is shown diagrammatically in the accompanying drawing, of which the single FIGURE is a side elevational view of an electrode.

As can be seen, a hollow electrode 17 is arranged so as to project through a furnace cover 21 and dip in a mixture of flux and ores (briefly called burden hereinafter). A hollow electrode passageway 18, disposed centrally in electrode 17, is supplied by means of a worm conveyor 2 with burden coming from a bunker 1. The gas, commonly carbon monoxide, necessary to convey the burden to the interior of the furnace, is introduced through a conduit 4 disposed near the outlet of worm conveyor 2, and the resulting mixture of burden and gas is introduced into the furnace, through inclined conduit 15 and the hollow electrode's passageway 18. Mounted on the lower end of inclined conduit 15 is the instrument for measuring the length of the electrodes. The actual measuring instrument comprises a steel test rod 20 having a slightly thicker round steel rod 12 secured to its lower end. Fast with the upper end of test rod 20 is a fairly long and flexible steel cable 8 which can be rolled up and off by means of a cable pulley 24 provided with a cable drum 9 and a crank handle 10. Steel cable 8 and test rod 20 are connected together by means of an insulating structural part 5 which is a safeguard against the passage of current through, and the fusion of, steel cable 8, if the inconsistent potential prevailing inside a hollow electrode should effect the flow of such current through the cable. Welded on to the lower end of inclined conduit 15 is a tubular socket 14, which is extended vertically upwards and is provided with a ball cock, and tight-screwed thereto by means of a screw collar ring 13 is a measuring tube 6 receiving measuring rod 20. The measuring tube 6 is provided with a cantilever 11 and secured thereto is a cable drum 9 receiving steel cable 8. By means of a packing box 3 disposed at the upper end of measuring tube 6, the steel cable is passed in gastight manner through tube 6. Cable drum 9 or steel cable 8 have a metering instrument or a length indicator attached thereto, recording the length of uncoiled cable. It is also necessary to provide the measuring instrument with a manometer 7 which is connected to measuring tube 6. Cable pulley 24 positioned upstream of measuring tube 6 is secured to a clamp-shaped cable winch 23 which is fastened to the upper end of measuring tube 6, laterally with respect thereto. Measuring tube 6, cantilever 11 and cable drum 9 are made in light weight construction. The measuring instrument described hereinabove is mounted on to each of the hollow electrodes. Once the ball cock, positioned between tubular socket 14 and measuring tube 6, has been closed it is possible to disassemble the measuring instrument with no need to arrest operation of the electrode, if this should become necessary, for example for packing the electrode with electrode mass.

For measuring, worm conveyor 2 should conveniently be operated at an increased speed of rotation. As a result, the furnace is supplied with more dusting burden which obviates fusion of measuring rod 20 and steel cable 8 in the lower incandescent portion of electrode 17 and which additionally prevents measuring rod 20 from dipping in the arc, through the passageway left in the electrode and terminating in the electrode tip.

In neutral position, measuring rod 20 is retracted upwardly in measuring tube 6. By actuating crank handle 10, it is possible for the operator standing on platform 16, which is fast with electrode 17, to advance and lower measuring rod 20 down to a position approximately level with the center portion of current-carrying contact plates 19. This should conveniently be done while operating the worm conveyor at slightly increased speed. The length of cable to be unrolled naturally depends on the design and length of the hollow electrode. Depending on the electrode's length, measuring rod 20 is in a position about 2 to 4 meters away from the lower end of the electrode, i.e., within the range of relatively low temperatures. Following this, it is necessary for the operator to read manometer 7 to determine whether the pressure of the gas supplied through inlet 4 and used to convey the burden has increased beyond the pressure normally prevailing in the interior of the furnace. The supply of dusty burden at an increased rate is intended to effect the formation of a cushion of dusty material accumulating around the lower end of hollow electrode 17 and clogging the hollow electrode's passageway 18. As a result, the pressure prevailing therein is increased. If increased pressure is found to prevail therein, measuring rod 20 is further advanced and placed on the cushion of dusty burden (active or measuring position).

It is also possible in accordance with this invention to effect a pressure increase (this can be determined by reading manometer 7), or to accelerate the formation of a cushion of accumulating dusty burden effecting such pressure increase, by operating the hollow electrode from a measuring station under slightly higher electric load. To this end, the entire electrode together with working platform 16 and contact plates 19 is lowered so as to reach more deeply into the melting furnace. As a result, any cavity which may have formed downstream of the lower end of the passageway left in the electrode is more rapidly filled with dusty burden travelling through the hollow electrode's passageway 18, and passageway 18 becomes more rapidly obstructed at its lower end around the electrode tip. The depth of immersion of measuring rod 20 in passageway 18 is easy to determined by means of a meter recording device. The distance between the neutral position of measuring rod 20 and the lowermost edge of contact plates 19 is a constant fixed in designing the electrode. The difference between the length tested and this known distance is equal to the length which the electrodes have downstream of contact plates 19.

The process of the present invention also enables the length of electrodes to be tested automatically. For example, if use is made of an appropriately insulated measuring rod 20 and steel cable 8, an indication of contact between measuring rod 20 and the conductive cushion of dusty burden is given by voltage to ground (test lamp). The potential found to occur emits pulses which can be given to an electric motor replacing crank handle 10. The electric motor is connected to cable drum 9 and directs the latter to retract uncoiled steel cable 8. It is possible for the means driving the cable drum to be actuated from, and for the means indicating the length of uncoiled cable to be placed in, a central measuring station.

The invention relates more particularly to a process for determining the length of a hollow electrode in an electrothermal melting furnace, which comprises introducing dusty burden into the furnace by conveying the burden with the use of an auxiliary gas through a passageway left in the hollow electrode and, while supplying the dusty burden, effecting the formation of a cushion of dusty burden around the lower end of said passageway in the hollow electrode; unrolling a steel cable having a measuring rod secured to it and passing the steel cable at short intervals through the said passageway in the hollow electrode so as to produce contact between the said measuring rod and the said cushion of dusty burden; measuring the length of the hollow electrode by determining the length of the unrolled steel cable; and retracting the steel cable.

Further embodiments of the present process, which can be used singly or in combination, comprise:

a. effecting the formation of the cushion of dusty burden around the lower end of the passageway left in the hollow electrode by temporarily increasing the supply of dusty burden through said passageway;

b. effecting the formation of the cushion of dusty burden around the lower end of the passageway left in the hollow electrode by operating the hollow electrode under higher electric load, i.e., by lowering the hollow electrode so as to more deeply reach into the electrothermal melting furnace;

c. advancing the steel cable with the measuring rod secured to it through the said passageway in the hollow electrode down to a position where the measuring rod is approximately level with current-carrying plates contacting the hollow electrode from the outside; maintaining the measuring rod in that position until pressure increase of the auxiliary gas indicates the formation of the cushion of dusty burden around the lower end of the passageway in the hollow electrode; and, following the formation of said cushion, advancing the measuring rod further through said passageway so as to produce contact between said measuring rod and the said cushion; determining the length of unrolled steel cable, and retracting the measuring rod;

d. electrically insulating the steel cable and the measuring rod so as to produce an electrical potential to ground upon contact between the measuring rod and the electrically conductive cushion of dusty burden, and using electric pulses emitted by said potential for retracting the measuring rod and re-coiling the steel cable.

The invention also provides an apparatus for measuring the length of a hollow electrode dipping in an electrothermal melting furnace, the said electrode being traversed vertically downwards by a central passageway, the upper end of which is inclined, projects outwardly and is connected to a supply means, which apparatus comprises a tubular socket 14 extending vertically upwards, coaxially with respect to the vertically extending portion of passageway 18 and mounted on to the upper inclined end 15 of the passageway 18 left in the hollow electrode, a measuring tube 6 filled with a clamp-shaped cable winch 23, a manometer 7 and a cantilever 11, the cantilever 11 being disposed rectangularly with respect to said measuring tube 6 and the measuring tube 6 being secured to the said tubular socket 14 so as to be coaxial therewith; a cable drum 9 fastened to the end of the said cantilever 11; a cable pulley 24 disposed upstream of the measuring tube 6 and fast with the cable winch 23; a measuring rod 20 secured to a steel cable 8 rolled up on the cable drum 9 via the cable pulley 24; the measuring rod 20 being in neutral position when retracted in the measuring tube 6 and being in active measuring position when advanced through the tubular socket 14 and the passageway 18 left in the hollow electrode down to the lower end thereof.

Further embodiments of the apparatus of the present invention, which can be used singly or in combination, provide:

a. for the measuring tube 6 to be fitted at its upper end with a packing box 3 for the passage of the steel cable 8 therethrough;

b. for the upper end of the measuring rod to be fitted with an electric insulation 5 and for the lower end of the measuring rod 20 to be fitted with a cylindrical steel structure 12;

c. for the cable drum 9 to be fitted with a crank handle 10 for unrolling and retracting the steel cable;

d. for the cable drum 9 to be fitted with a meter recording device indicating the length of uncoiled steel cable 8; and e. for the steel cable 8 to be fitted with a length indicator.

We claim:

1. A process for measuring the length of a hollow electrode in an electrothermal melting furnace, which comprises introducing dusty burden into the furnace by conveying the burden with the use of an auxiliary gas through a passageway left in the hollow electrode and, while supplying the dusty burden, effecting the formation of a cushion of dusty burden around the lower end of said passageway in the hollow electrode; unrolling a steel cable having a measuring rod secured to it and passing the steel cable at short intervals through the said passageway in the hollow electrode so as to produce contact between the said measuring rod and the said cushion of dusty burden; measuring the length of the hollow electrode by determining the length of the unrolled steel cable; and retracting the steel cable.

2. The process as claimed in claim 1, wherein the cushion of dusty burden around the lower end of the passageway left in the hollow electrode is produced by temporarily increasing the supply of dusting burden through said passageway.

3. The process as claimed in claim 1, wherein the cushion of dusty burden around the lower end of the passageway left in the hollow electrode is produced by operating the hollow electrode under higher electric load, namely by lowering the hollow electrode so as to more deeply reach into the electrothermal melting furnace.

4. The process as claimed in claim 1, wherein the steel cable with the measuring rod secured to it is advanced through the said passageway in the hollow electrode down to a position where the rod is approximately level with current-carrying plates contacting the hollow electrode from the outside, and maintained in that position until pressure increase of the auxiliary gas indicates the formation of the cushion of dusty burden around the lower end of the passageway in the hollow electrode; and wherein, following the formation of said cushion, the measuring rod is further advanced through said passageway so as to produce contact between said measuring rod and the said cushion; the length of unrolled steel cable is measured and the measuring rod is retracted.

5. The process as claimed in claim 1, wherein the steel cable and the measuring rod are electrically insulated so as to produce an electrical potential to ground upon contact between the measuring rod and the electrically conductive cushion of dusty burden, and electric pulses emitted by said potential are used for retracting the measuring rod and re-coiling the steel cable.

6. An instrument for measuring the length of a hollow electrode dipping in an electrothermal melting furnace, the said electrode being traversed vertically downwards by a central passageway, the upper end of which is inclined, projects outwardly, and is connected to a supply means, which apparatus comprises a tubular socket 14 extending vertically upwards, coaxially with respect to the vertically extending portion of passageway 18 and mounted on to the upper inclined end 15 of the passageway 18 left in the hollow electrode; a measuring tube 6 fitted with a clamp-shaped cable winch 23, a manometer 7 and a cantilever 11, the cantilever 11 being disposed rectangularly with respect to said measuring tube 6 and the measuring tube 6 being secured to the said tubular socket 14 so as to be coaxial therewith; a cable drum 9 fastened to the end of the said cantilever 11; a cable pulley 24 disposed upstream of the measuring tube 6 and fast with the cable winch 23; a measuring rod 20 secured to a steel cable 8 rolled up on the cable drum 9 via the cable pulley 24; the measuring rod 20 being in neutral position when retracted in the measuring tube 6 and being in active measuring position when advanced through the tubular socket 14 and the passageway 18 left in the hollow electrode down to the lower end thereof.

7. The instrument as claimed in claim 6, wherein the measuring tube 6 is fitted at its upper end with a packing box 3 for the passage of the steel cable 8 therethrough.

8. The instrument as claimed in claim 6, wherein the upper end of the measuring rod 20 is fitted with an electric insulation and the lower end of the measuring rod 20 is a cylindrical steel structure 12.

9. The instrument as claimed in claim 6, wherein the cable drum 9 is fitted with a crank handle 10 for unrolling and retracting the steel cable 8.

10. The instrument as claimed in claim 6, wherein the cable drum 9 is fitted with a meter recording the length of uncoiled steel cable 8.

11. The instrument as claimed in claim 6, wherein the steel cable 8 is fitted with a length marker.

* * * * *